July 14, 1931.                M. CASTRO                1,814,786
                    AIRCRAFT SIGNALING APPARATUS
                    Filed July 3, 1929    3 Sheets-Sheet 1
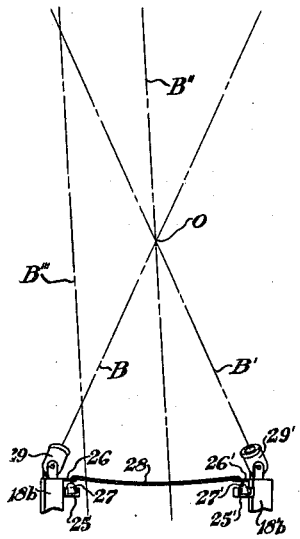
Fig. 5
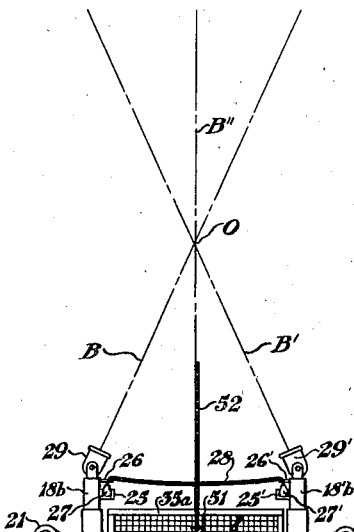
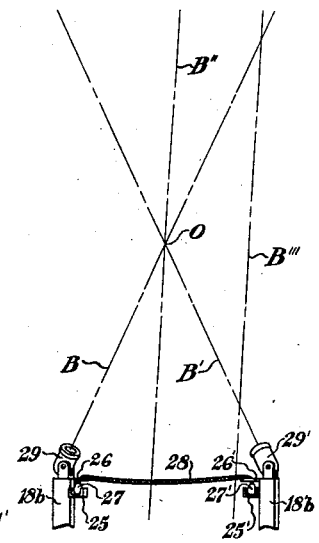
Fig. 7
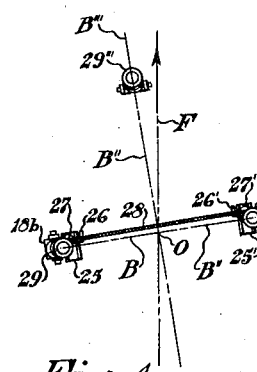
Fig. 4
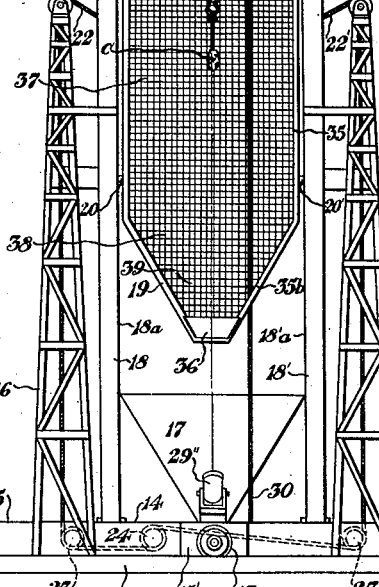
Fig. 1
Fig. 6
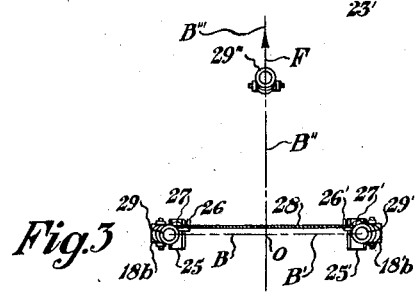
Fig. 3
Inventor
Manuel Castro
By Harry Frease
Attorney July 14, 1931. M. CASTRO 1,814,786
AIRCRAFT SIGNALING APPARATUS
Filed July 3, 1929 3 Sheets-Sheet 3

Inventor
Manuel Castro
By Harry Frease
Attorney

Patented July 14, 1931

1,814,786

UNITED STATES PATENT OFFICE

MANUEL CASTRO, OF CANTON, OHIO

AIRCRAFT SIGNALING APPARATUS

Application filed July 3, 1929. Serial No. 375,805.

My invention relates to apparatus for signaling aircraft, more particularly in connection with apparatus for picking up and discharging cargo in flight.

Such air cargo handling apparatus necessarily includes elements operatively mounted on the ground or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for co-operating with the ground elements in picking up and discharging cargo.

It is necessary that the aircraft be properly navigated towards and over the ground elements, in order to insure the proper operation of the aircraft and ground elements.

The objects of the present improvements include the provision of novel signaling apparatus for use more particularly at night, and which will facilitate accurate navigation of an aircraft along an indicated course and at an indicated altitude.

Such signaling apparatus is useful as a general aid to air navigation, and is particularly useful in connection with air cargo handling apparatus.

The foregoing and other objects are attained by the present invention which includes a continuation of the common subject matter of the inventions set forth in my prior application for patent for cargo handling apparatus for aircraft and the like, filed October 2, 1928, Serial No. 309,881, and in my divisional applications thereof, Serial No. 317,059, and Serial No. 317,060.

Figure 2:
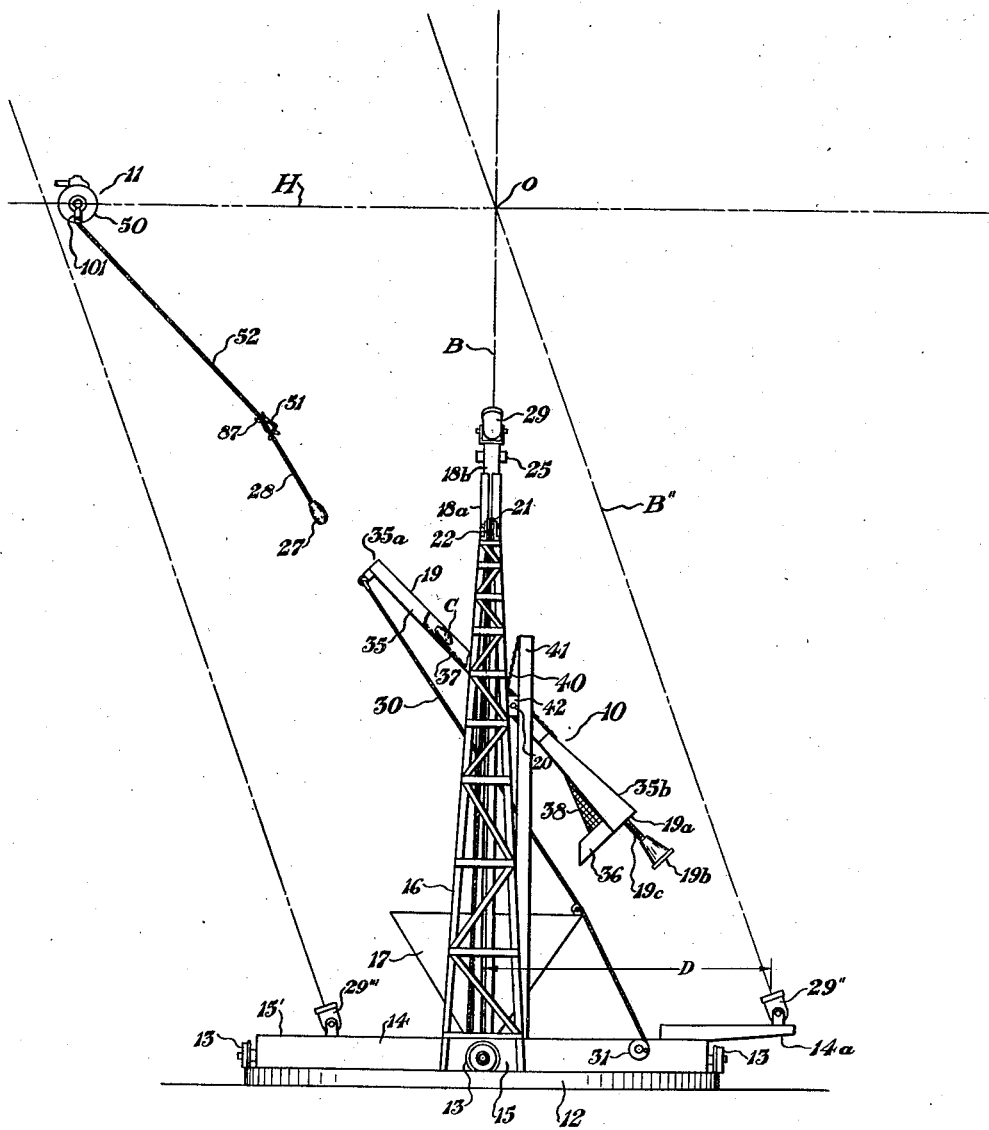
Figure 9:
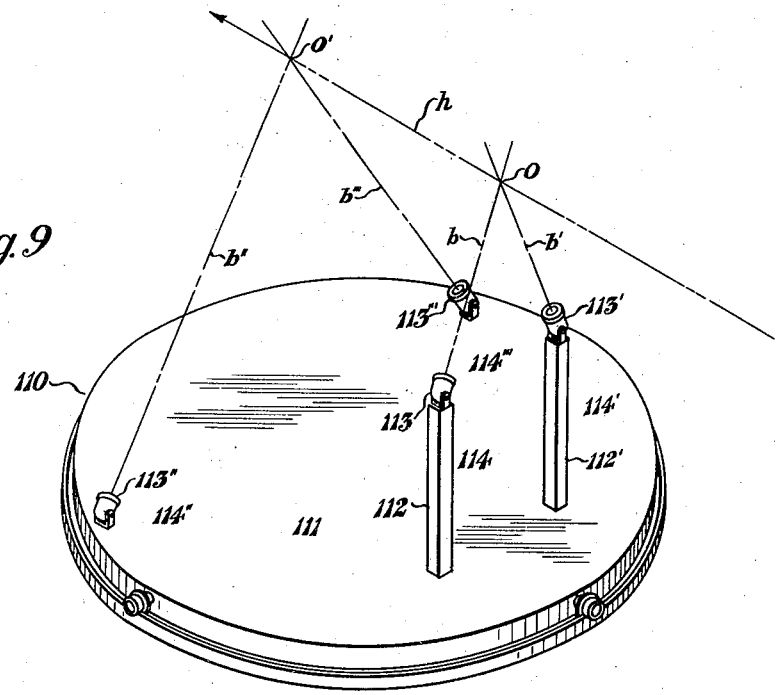
Figure 8:
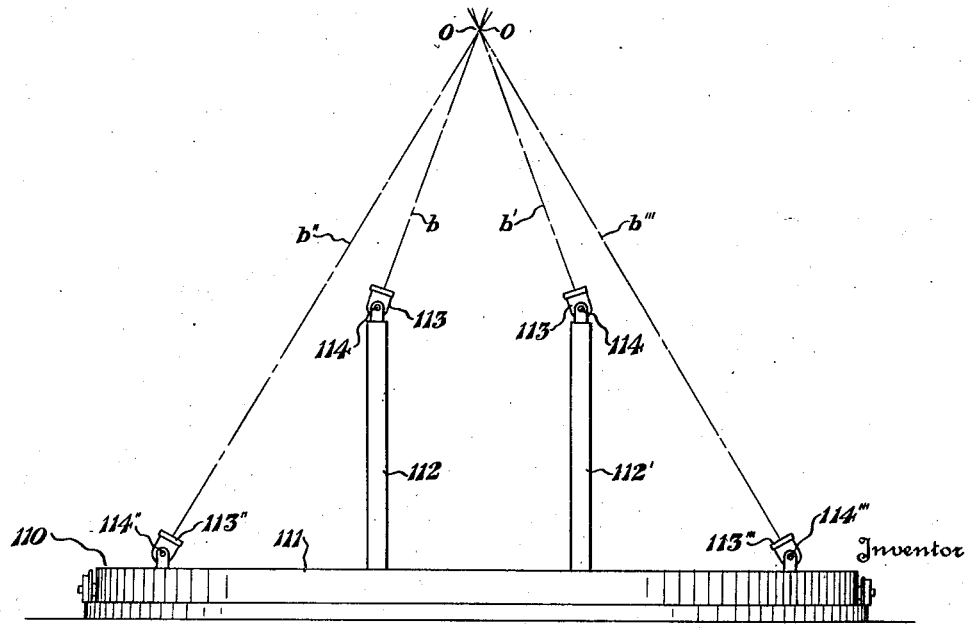

A preferred embodiment of the present invention is hereinafter set forth in detail, and is illustrated in the accompanying drawings forming part hereof, in which Figure 1 is a fragmentary on-side elevation illustrating the improved signaling apparatus in use with cargo handling apparatus ready for automatic operation at night for discharging a cargo and picking up another cargo;

Fig. 2, a fragmentary side elevation thereof illustrating the apparatus just after the cargo has been discharged and received by the ground elements and the new cargo has been picked up by the aircraft elements;

Fig. 3, a diagrammatic top plan view illustrating the relation of the line of flight with the beams of the signaling apparatus, when the line of flight coincides with the course indicated by the signaling apparatus, and the pilot views the signaling apparatus as illustrated in Fig. 1;

Fig. 4, a view similar to Fig. 3, and illustrating a line of flight to the left of the indicated course;

Fig. 5, a diagrammatic view similar to Fig. 1, illustrating the characteristic arrangement of the beams of the signaling apparatus which visually inform the pilot that the line of flight is to the left of the indicated course, as illustrated in Fig. 4;

Fig. 6, a view similar to Figs. 3 and 4, and indicating a line of flight to the right of the indicated course;

Fig. 7, a view similar to Fig. 5, and illustrating the characteristic arrangement of the beams of the signal apparatus which visually inform the pilot that the line of flight is to the right of the course as illustrated in Fig. 6;

Fig. 8, a diagrammatic front elevation view illustrating another embodiment of the improved signaling apparatus; and Fig. 9, a diagrammatic perspective view thereof;

Similar numerals refer to similar parts throughout the several views.

The improved signaling apparatus is illustrated in use in connection with improved cargo handling apparatus which includes ground elements indicated generally at 10 in Figs. 1 and 2, and aircraft elements indicated generally at 11.

The ground elements 10 include a circular track 12 mounted on a suitable foundation on the ground, or on a ground structure, or on a ship, and on which track are arranged to roll wheels 13 which are rotatably mounted on and support a base frame 14, whereby the base frame 14 and the remaining ground elements may be rotated about a vertical axis for placing the ground elements in the proper position with respect to the wind and the aircraft from which cargo is to be handled.

The base frame 14 may be in the form of a cross as illustrated, and may include axially and centrally intersecting panels 15 and 15' at the outer ends of each of which the wheels 13 are rotatably mounted.

Preferably at equal distances from and on opposite sides of the vertical axis, the base panel 15 has mounted thereon upwardly extending towers 16 and 16'.

A cargo receiving hopper 17 is preferably arranged between the towers 16 and 16'.

Between the hopper 17 and the tower 16 an upwardly extending telescopic mast 18 is mounted on the base panel 15, and similarly an upwardly extending telescopic mast 18' is mounted on the base panel 15 between the hopper 17 and the tower 16', and the vertical axes of the towers and the masts are preferably parallel and in the same plane.

A tipping receptacle 19 into which cargo is discharged, is mounted for rotation between the telescopic masts 18 and 18' about horizontal pivots 20 and 20' which are supported on the masts 18 and 18', respectively.

The telescopic mast 18 includes a lower tubular member 18a within which an upper extensible member 18b is slidably mounted. Similarly the telescopic mast 18' includes a lower tubular member 18'a within which an upper extensible member 18'b is slidably mounted.

A pulley 21 is journalled at the top of the tower 16 and a pulley 21' is journalled at the top of the tower 16'.

One end of a rope or cable 22 is secured to the extensible member 18b within the tubular member 18a, and the cable 22 passes out from the top of the tubular member 18a, over the pulley 21, and longitudinally through the tower 16, and about a direction changing pulley 23 at the base thereof, to a hoisting drum 24 journalled in the base panel 15, where the other end of the rope or cable 22 is secured to the drum.

Similarly, one end of a rope or cable 22' is secured to the extensible member 18'b within the tubular member 18'a, and the cable 22' passes out from the top of the tubular member 18'a, over the pulley 21', and longitudinally through the tower 16', and about a direction changing pulley 23' at the base thereof, to a hoisting drum 24, where the other end of the rope or cable 22' is secured to the drum; and the drum is adapted in a well known manner for reversely winding and unwinding the ropes or cables 22 and 22' thereabout, for simultaneously raising and lowering the extensible members 18b and 18'b.

At the inside face of the upper end of the extensible mast member 18b, a cargo positioning platform 25 is mounted; and similarly at the inside face of the upper end of the extensible mast member 18'b, a cargo positioning platform 25' is mounted.

Above the platform 25, a cargo connecting cable guide hook 26 is mounted on the mast member 18b, and similarly above the platform 25' a cargo connecting cable guide hook 26' is mounted on the mast member 18'b.

A bag 27 containing part of the cargo to be picked up is supported on the platform 25, and a bag 27' containing the remaining part of the cargo to be picked up is supported on the platform 25', the weight of the two bags and contents being adjusted to be substantially equal, and a cargo connecting cable 28 is fastened at its ends to the bags 27 and 27', respectively.

The cargo connecting cable 28 extends horizontally from guide hook to guide hook, and downwardly therefrom to the bags 27 and 27', the guide hooks opening in a direction perpendicular to the plane of the masts from one side of such plane.

A cable 30 is connected at its upper end with the tipping receptacle 19 and at its lower end with a suitable preferably automatic retrieving drum 31 for manually tipping the receptacle 19.

The tipping receptacle 19 preferably includes members forming a closed frame 35 which is rectangular at its upper end as at 35a, and is tapered at its lower end as at 35b and terminates in a chute 36.

A preferably wire spring fabric 37 is stretched entirely across the frame opening and secured to the frame members at the off-side thereof; and a preferably wire spring fabric 38 is stretched across the lower end of the frame opening and secured to the frame members at the on-side thereof, forming a pocket at 39 at the lower end of the receptacle 19 into which cargo may drop and be delivered therein to the chute 36, and thence to the hopper 17.

The upper end of the on-side fabric 38 preferably extends free of the frame at 40 and therefrom upwardly to a position where it is secured at the ends of posts 41 provided at the on-side of the masts for this purpose and also for the purpose of forming a support for off-set bearing blocks 42 in which the receptacle pivots 20 and 20' are preferably journalled.

As illustrated in Fig. 3, the tipping receptacle 19 is provided at its lower end 19a with a counterbalance 19b slidably mounted on a screw 19c extending downwardly from the tipping receptacle.

Accordingly if a cargo bag C strikes the upper end of the receptacle 19, and is discharged thereon, the cargo bag C will either drop into the pocket 39 and out through the chute 36 into the hopper 17 or will rotate the upper end of the tipping receptacle 19 downwardly to a position from which the cargo bag C will drop directly into the hopper 17, depending upon the velocity with which the cargo bag C strikes the tipping receptacle.

For night operation, the improved signaling apparatus includes a beam search light 29 mounted at the top of the extensible mast member 18b, and arranged to be rotated about a horizontal axis parallel to the plane of the masts; and similarly a beam search light 29' is mounted at the top of the extensible mast member 18'b, and arranged to be rotated about a horizontal axis perpendicular to the plane of the masts; whereby for night operation of the improved cargo handling apparatus, or merely for facilitating night flying, the search lights 29 and 29' are adjusted so that their beams B and B', respectively, intersect at O on the vertical axis of the ground elements midway between the masts, at a predetermined distance above the horizontally extending connecting cable 28.

A third search light 29" is mounted on a supporting frame 14a extending from the base frame 14, and the search light 29" is located on its supporting frame a substantial distance D from the on-side of the towers 16 and 16', and midway between the towers.

The search light 29" is arranged to be rotated about a horizontal axis parallel with the plane of the masts, and is so adjusted that its beam B" passes through the intersection O of the beams of the lights 29 and 29'.

A fourth search light 29''' is mounted on the base frame 14 on the off-side of the towers 16 and 16', and midway between the towers. The search light 29''' is arranged to be rotated about a horizontal axis parallel with the plane of the mast, and is preferably so adjusted that its beam B''' is parallel with the beam of the light 29".

The beam B" of the light 29" passing through the intersection of the beams B and B' of the lights 29 and 29', thus lies in the vertical plane of the desired course, and the beam B" is a visible course line, for all elevations of the pilot above, below, or at the intersection O of the beams B and B' through which passes the imaginary true horizontal course line H.

The beam B''' of the light 29''' by reason of its adjustment about a horizontal axis, also lies in the vertical plane through the course line B", and by directing the beam B''' parallel with the beam B" of the light 29", the characteristic arrangements of the beams for visually informing the pilot of his location with respect to the indicated course, are made easier to recognize.

These characteristic arrangements as normally viewed by the pilot are illustrated in Figs. 1, 5, and 7 and will be described in greater detail hereafter.

The foregoing constitutes a preferred embodiment of the ground members of improved cargo handling apparatus for aircraft and the like, and include the improved signaling apparatus of the present invention.

The aircraft members of the improved cargo handling apparatus include an improved reel 50 suitably mounted in the aircraft fuselage not shown, and an improved combined pick up and discharging means 51, releasably connected to each other by a cable 52.

The reel 50 and the pick up and discharge means 51, are set forth in detail in my prior application for patent, Serial No. 309,881, and divisional applications thereof, Serial No. 317,059, and Serial No. 317,060.

The improved signaling apparatus hereof may be used with the improved cargo handling apparatus for aircraft for picking up and discharging cargo by arranging the ground elements and signaling apparatus as illustrated in Figs. 1 and 2, and by paying out the cable 52 from the aircraft in which the reel 50 is carried, a suitable distance depending on the weight of the cargo C to be discharged, and which cargo is carried by the combined pick up and discharge means 51.

In night-time operation, the pilot steers his course by the intersections of the beams of the search lights 29 and 29' and 29" and 29''', as will hereinafter be described in detail.

The cable 52 will first strike the cable 28 connecting the cargoes 27 and 27' to be picked up, and the reel cable 52 will be dragged over the transversely extending cargo connecting cable 28, until one of the hook arms 87 of the pick up and discharge means 51 hooks against the transversely extending cargo connecting cable 28; when the first action of the moving combined pick up and discharging means striking the stationary cargo connecting cable 28, will be to discharge the cargo C into the tipping receptacle 19, from which it is delivered into the hopper 17 either through the chute 36, or by rotation of the upper end of the tipping receptacle, depending upon the velocity with which the discharged cargo C strikes the upper end of the tipping receptacle 19.

Simultaneously, the hook arm 87 will have caught the transversely extending cable 28 and due to the yielding resistance of the unwinding reaction provided by the improved reel 50, the cable 52 will first be payed out until a velocity has been imparted to the picked up cargo equal to the velocity of the aircraft, the distance that the cable is required to be payed out, depending as aforesaid on the weight of the cargo to be picked up.

When the picked-up cargo has attained the velocity of the moving aircraft, the pilot or other operator in the aircraft may turn the reel crank 101 to reel in the cable and bring the picked-up cargo within the aircraft, after which the cable may be reeled out for discharging and picking up other cargoes.

When steering his course by the characteristic arrangements of the beams B, B', B", and B''' of the search lights 29, 29', 29", and 29''', when the line of flight F coincides with the desired course line B", the beam B" as it appears to the pilot bisects the upper and lower angles between the beams B and B' regardless of the elevation of the pilot relative to the intersection, since the pilot is located in the vertical plane through the course line B".

When the line of flight F is at the left of the desired course line B" as indicated in Fig. 4, the course line B" no longer bisects the intersecting beams B and B', the lower angle to the left of the course line being larger than the lower angle to the right, and vice versa for the upper angles.

This variation in the upper and lower angles between the course beam or line B" and the beams B and B' is normally sufficient to keep the pilot on his course, since he needs only steer the aircraft so as to maintain the course beam or line B" in the bisecting arrangement.

Slight variations in these angles, are relatively hard to detect, however, and in order to facilitate detection of a slight departure from the course, the beam B''' is utilized.

When the pilot is properly located in the course plane, the beam B''' is not apparent to him, being directly behind the course beam or line B'''. When the line of flight F is to the left, the beam B''' immediately appears at the left of the intersection O of the beams B, B', and B".

Conversely when the line of flight F is at the right of the course beam or line B", the beam B''' immediately appears at the right of the intersection O.

In other words, whenever the pilot sees two parallel beams he knows he is off his course, and the side of the course on which he is located, is indicated by the side of the intersection O upon which the beam B''' appears.

The modified embodiment 110 of the invention, illustrated diagrammatically in Figs. 8 and 9, may include a turn table 111 upon which are mounted masts 112 and 112'. The masts are of equal height, and at the upper end of the mast 112 a search light 113 is mounted, and at the upper end of the mast 112' a search light 113' is mounted.

The search lights are arranged for rotation about horizontal axes 114 and 114', and the horizontal axes are preferably parallel. The search lights 113 and 113' are adjusted so that the beam $b$ of the search light 113, and the beam $b'$ of the search light 113' intersects at O preferably midway between the axes of rotation of the search lights.

At the rear of the search lights 113 and 113', search lights 113" and 113''' are mounted preferably on the turn table 111, for rotation respectively about horizontal axes 114" and 114''' which are preferably parallel with each other and with the axes 114 and 114'.

The axes 114' and 114" are preferably spaced equal horizontal distances from the axes 114 and 114' in any plane intersecting all of the axes.

The beams $b''$ and $b'''$ of the search lights 113" and 113''' are adjusted to intersect at O' midway between the axes 114" and 114''', and preferably at the same elevation as the elevation O of the beams $b$ and $b'$.

The imaginary horizontal line $h$ extending through the intersections O and O' may then be a horizontal course line, in which a pilot is traveling if the intersections O and O' coincide with each other and appear as illustrated in Fig. 8.

The angle between the beams $b$ and $b'$ is preferably less than the angle between the beams $b''$ and $b'''$, and any deviation from the course offsets the intersections O' and its component beams, to the left or right of the intersection.

Accordingly if the beams are viewed as in Fig. 9, the pilot is above and to the left of the desired course.

While the signaling apparatus 110 is somewhat different in detail from the apparatus 10, both are alike, in that deviation from a desired line of flight through an intersection of two light beams, is indicated by a visual indicator appearing at the right or left of the desired intersection, depending on whether the observer is located at the right or left of the intersection.

It is to be observed that the intersection O in each of the apparatuses determines not only the elevation, but the lateral location of the point O between the towers or posts, and the improved signaling apparatus also provides means indicating lateral deviation from a vertical plane passing through the intersection O and normal to the plane of the beams intersecting at O.

It is to be noted in each instance that the location of the searchlights at the top of towers or masts provides means for indicating elevation in addition to the intersection of the beams from the tower or mast lights.

That is to say the foot of each beam at one tower is at the level of the foot of the beam at the other tower.

The feet of these beams are also at an elevation known to the pilot, by prearrangement or by radio.

The lateral distance between the feet of the beams is also known to the pilot, and provides a measure of distance for the pilot's use in navigating the aircraft.

I claim:

1. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, and means for emitting a course indicating light beam in the vertical plane of the course.

2. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, and means for emitting a course indicating light beam in the vertical plane of the course, the course indicating beam passing through the point of intersection of the first mentioned beams.

3. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, means for emitting a course indicating light beam in the vertical plane of the course, and means for emitting another light beam in the vertical plane of the course.

4. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, means for emitting a course indicating light beam in the vertical plane of the course, the course indicating beam passing through the point of intersection of the first mentioned beams, and means for emitting another light beam in the vertical plane of the course.

5. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, means for emitting a course indicating light beam in the vertical plane of the course, and means for emitting another light beam in the vertical plane of the course, and parallel with the course indicating beam.

6. Signaling apparatus for aircraft and the like including a plurality of means each emitting a light beam, and the beams extending upwardly and towards each other in a plane at right angles to the desired course, and the beams intersecting at a point in the course having a predetermined elevation and location between the light emitting means, means for emitting a course indicating light beam in the vertical plane of the course, the course indicating beam passing through the point of intersection of the first mentioned beams, and means for emitting another light beam in the vertical plane of the course, and parallel with the course indicating beam.

In testimony that I claim the above, I have hereunto subscribed my name.

MANUEL CASTRO.